United States Patent Office 2,909,506
Patented Oct. 20, 1959

2,909,506

MODIFIED ACROLEIN-PENTAERYTHRITOL RESINS

Howard R. Guest, Charleston, Joe T. Adams, St. Albans, and Ben W. Kiff, Ona, W. Va., assignors to Union Carbide Corporation, a corporation of New York No Drawing. Application July 10, 1956
Serial No. 596,814

3 Claims. (Cl. 260—67)

The subject of this invention is a resin formed by the condensation of acrolein and pentaerythritol and a modifier for such condensation products to form cured polymers of higher heat resistance.

The formation of polymers by the condensation of acrolein and pentaerythritol is known, but the process has been given only limited attention. At present, two methods are known for carrying out the polymer reaction. According to one method, the reaction is carried out by first forming and isolating the unsaturated acetal resulting from the reaction of acrolein and pentaerythritol, having the structure:

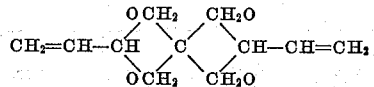

3,9-divinylspirobi(m-dioxane), M.P. 43° C.
(diallylidene-pentaerythritol)

This unsaturated acetal is then reacted with a polyhydric alcohol in the presence of an acidic catalyst to yield a polymer. Suitable polyhydric alcohols include sorbitol, trimethylol ethane or trimethylol propane. This method has the disadvantage that isolation and purification of the intermediate acetal is required.

The practice of the second method involves the formation of a liquid pre-condensate by reacting acrolein and pentaerythritol in reciprocal proportion to their functionality. Thus, pentaerythritol has a functionality of four as a polyhydric alcohol, and acrolein has a functionality of three, considering the reactivity of both the carbonyl group and the olefinic group. The pre-condensate thus formed on reacting about three moles of pentaerythritol and about four moles of acrolein in the presence of an acid catalyst is a viscous liquid or A-stage resin which slowly condenses to a solid plastic. However, for practical applications, the condensation can be stopped by the neutralization of the catalyst. The neutral liquid pre-condensate can be stored until needed and can then be hardened into a plastic by the addition of a mineral acid or a strong organic acid. However, this method has the disadvantage that the resulting plastic materials have very poor impact strength.

As described in our copending application Serial No. 596,431, filed July 9, 1956, entitled Catalytic Process for Making Stable Acrolein-Pentaerythritol Condensates, it has been found that hydrochloric acid is an excellent catalyst for the first stage or acetal reaction between acrolein and pentaerythritol. However, this acid is a poor catalyst for the curing or etherification reaction, so that complete removal of the catalyst from the first or A-stage resin is not required in order to obtain an A-stage or liquid resin which will not harden on storage. It is desirable, however, to remove as much of the catalyst as is possible by stripping.

Because hydrochloric acid is a poor etherification catalyst, it is possible to carry the first stage reaction to high viscosities without danger of premature gelation of the reactants in the kettle. By control of the viscosity of the A-stage resin, it is possible to adjust the properties of the cured polymer. Thus, if the reaction is stopped when the viscosity of the mixture is 50 to 75 cps., and the resin, after removal of volatile materials, is cured with another catalyst, the polymer so produced has a relatively high heat distortion point of about 90° C. to 100° C. or higher but only moderate impact strength. On the other hand, if the reaction is continued until the viscosity of the reaction mixture is 75 to 350 cps., the polymer made from such material has a lower heat distortion point, but excellent impact strength. Efforts to obtain resins of optimum properties by blending high and low viscosity resins have not been too promising.

While the viscosity of the reaction mixture can be used as a control measure to determine the resin viscosity desired, a more precise determination of the viscosity of the A-stage resin is accomplished after stripping off volatile material. Thus, after removing volatile materials, for instance, those which boil below 150° C. at atmospheric pressure, a low viscosity A-stage resin may be defined as one having a viscosity of 5000 to 25,000 cps. at 40° C. Similarly, a high viscosity resin may be considered to have a viscosity of 25,000 to 500,000 cps. at 40° C.

It has now been found that resins having excellent heat distortion points and good impact strength can be obtained by adding a small amount, i.e. from 2 to 7.5%, of 3,9-divinylspirobi(m-dioxane), to the liquid A-stage resins, and curing the resins in the presence of an acidic catalyst. If larger amounts of the divinyl compound within the range of 7.5 to 25% of the total composition are added, cured polymers of still higher heat distortion points can be obtained, but at some sacrifice of impact strength.

Since 3,9-divinylspirobi(m-dioxane) melts at about 43° C., it is convenient to add it to the A-stage resin at a temperature of 45° C. or higher. The curing catalyst can then be added, conveniently dissolved in the spirobi compound, and the resin poured into the desired form and cured.

High and low viscosity resins as previously defined differ from each other in two essential respects. Both the high and low viscosity resins can be considered as consisting of a 3,9-divinylspirobi(m-dioxane) or a reactive solvent moiety and a polyether-acetal resin moiety. The viscosity of a composition is a function not only of the amount of 3,9-divinylspirobi(m-dioxane) present, but also the degree of condensation that has entered into the formation of the polyether-acetal resin moiety. Thus the addition of the 3,9-divinylspirobi(m-dioxane) to a high viscosity resin to equal the known 3,9-divinylspirobi(m-dioxane) content of a normally low viscosity resin will not produce identical compositions. The higher molecular weight of the polyether acetal moiety originally residing in the high viscosity resin remains a distinguishing characteristic even after dilution with 3,9-divinylspirobi(m-doxane). Hence finished resins cured from intermediate compositions with equal amounts of 3,9-divinylspirobi(m-dioxane) will differ in their physical properties depending upon the nature of the polyether-acetal structure present in the intermediate stage. Since high impact strengths rather than high heat distortion values are associated with a high molecular weight of this intermediate polyether-acetal structure, the addition of 3,9-divinylspirobi(m-dioxane) in appropriate quantities to high viscosity resins as previously defined makes possible high impact resins in the cured stage with vastly improved heat distortion values.

The use of the 3,9-divinylspirobi(m-dioxane) is not confined to those resins in which the A-stage material is prepared using hydrochloric acid as catalyst. If so desired, the first reaction between acrolein and pentaerythritol can be catalyzed by any one of several catalysts such as sulfuric acid, toluenesulfonic acid, or benzenesulfonic acid. While the mixture is still liquid the unsaturated acetal may be added in the desired amount and the resin then cured using the same catalyst which was present during the first reaction. In addition, if so desired, catalysts of this type may be used for the reaction to produce the A-stage polymer and when it is completed the acid may be neutralized with a base, such as sodium carbonate or sodium acetate. The 3,9-divinylspirobi(m-dioxane) may then be added and the resin cured in the desired fashion.

If the unsaturated acetal is added to A-stage material which has been produced using hydrochloric acid in the process described above, any one of a number of acids or acid-reacting compounds can be used as curing catalysts. Among these are sulfuric acid, toluenesulfonic acid, benzenesulfonic acid, phosphoric acid, stannic chloride, aluminum chloride, boron trifluoride, ferric chloric, titanium tetrachloride, and mixed alkanesulfonic acids (a mixture which is predominantly ethanesulfonic acid but which contains some methanesulfonic acid and propanesulfonic acid).

The reaction to produce the A-stage material is best accomplished at 70 to 80° C. although it can be run as low as 60° C. and range as high as 100° C. The reaction time may be varied from 30 minutes to five hours depending upon the viscosity desired. The molar ratio of acrolein to pentaerythritol may be varied from 1.3/1 to 1.9/1 and also affects the resin viscosity.

The resins may be cured at temperatures from 50° C. to 200° C. with the preferred range being 70° to 120° C. The curing time required may range from a few minutes to 72 hours depending upon the temperature. Thus, at 50° C., as long as 72 hours may be required while at 150° C. as little as ten minutes may be sufficient. At 70° C. the usual curing time is 16 hours while at 100° C. from three to eight hours is required.

The cured resins of this invention may be used in any of the applications where rigid plastic materials of good strength and toughness, and light in color, are desired. Also, because of their excellent light stability and resistance to hydrolysis, they are valuable for many fields now served by the methyl methacrylate resins, such as display signs, ornaments, fixtures, and dentures. The liquid resins may be used for sealing and potting compounds in the electrical industry. They are also valuable as laminating resins in making laminates of glass cloth.

EXAMPLE 1.—EFFECT OF ADDED 3,9-DIVINYL-SPIROBI(M-DIOXANE) ON RESIN PREPARED AND CURED WITH SULFURIC ACID CATALYST

A charge of 232 grams of acrolein (94.1%), 320 grams pentaerythritol and 1.105 grams of sulfuric acid in 2 cc. of water was placed in a 1-liter reaction flask. The reactor was equipped with stirrer, thermometer, condenser, and nitrogen feed line. While the mixture was stirred and held under nitrogen atmosphere the temperature was raised to 75° C. and held at that point for 1½ hours. The final viscosity of the reaction mixture was 128 cps. at 25° C. Portions of the resulting resin were stripped of volatile matter at 76°–80° C./3–4 mm., and different amounts of 3,9-divinylspirobi(m-dioxane) were added. The resins were then cured for 8 hours at 100° C. The results were as follows:

| 3,9-Divinylspirobi(m-dioxane) Added, Based on Stripped Resin, percent | Heat Distortion, ° C. | Impact Strength, Izod, Ft.-lbs./in. of Notch |
|---|---|---|
| 0 | 68 | 1.0 |
| 2.7 | 104 | 0.79 |
| 5.25 | 97 | 1.25 |
| 10 | 98 | 0.95 |
| 21.8 | 111 | 0.54 |
| 55.5 | 98 | 0.73 |

EXAMPLE 2.—EFFECT OF ADDED 3,9-DIVINYL-SPIROBI(M-DIOXANE) ON RESIN PREPARED WITH HYDROCHLORIC ACID CATALYST

A charge of 232 grams of acrolein (94.1%), 329 grams pentaerythritol and 1.79 grams of 37% hydrochloric acid was placed in the apparatus described in Example 1. The reaction was conducted at 74–76° C. for 2½ hours. At the end of that time the viscosity of the mixture at 25° C. was 138 centipoises. The volatile material was then stripped off to a kettle temperature of 76° C./4 mm. The stripped resin weighed 422 grams.

To 80 grams of this resin there was then added 0.3% toluenesulfonic acid dissolved in 25 cc. methyl acetate. After distilling out this solvent to a kettle temperature of 71° C./4 mm. the resin was poured into molds and cured 8 hours/100° C. The cured resin had these properties:

Heat distortion _____° C__ 58
Flexural modulus _____ p.s.i.__ 354,000
Hardness, durometer "D" _____ 81
Impact (Izod), ft.-lbs. per in. of notch _____ 1.6

To different portions (65 to 78 grams) of the stripped A-stage polymer were added 0.24 gram toluenesulfonic acid dissolved in different amounts of 3,9-divinylspirobi(m-dioxane) to yield in each instance 80 grams of compound. The material was poured into molds and cured at 100° C. for 8 hours. The cured resins had these properties:

| 3,9-Divinylspirobi (m-dioxane) Added, Percent | Heat Distortion, ° C. | Flexural Modulus, p.s.i. | Hardness, Durometer "D" | Impact (Izod), ft.-lbs. per in. of Notch |
|---|---|---|---|---|
| 0 | 58 | 354,000 | 81 | 1.6 |
| 2.5 | 79 | 407,000 | 84 | 1.5 |
| 6.25 | 88 | 307,000 | 84 | 1.2 |
| 12.5 | 97 | 333,000 | 83 | 1.0 |
| 18.75 | 104 | 346,000 | 84 | 0.9 |

EXAMPLE 3.—EFFECT OF ADDED 3,9-DIVINYL-SPIROBI(M-DIOXANE) ON RESIN PREPARED WITH HYDROCHLORIC ACID CATALYST

To the apparatus described in Example 1, there was charged a mixture of 99 grams of acrolein (94.1%), 136 grams of pentaerythritol and 1.02 grams of 37% hydrochloric acid. After reacting for 30 minutes at 80–82° C. the mixture had a viscosity of 128 cps. at 25° C. The resin was then stripped to a kettle temperature of 75° C. at 4 mm. To an 80 gram portion of the stripped A-stage material there was added 0.24 gram toluenesulfonic acid dissolved in 25 cc. of methyl acetate. After the solvent was stripped off the resin was cured in the usual way at 70° C. for 2 hours followed by 8 hours at 100° C. and it had these properties:

Heat distortion _____° C__ 83
Flexural modulus _____p.s.i__ 395,000
Hardness, durometer "D" _____ 84
Impact (Izod) (ft.-lbs. per in. of notch) _____ 1.6

To 75 grams of the stripped A-stage polymer there was added a mixture of 5 grams of 3,9-divinylspirobi(m-dioxane) and 0.24 toluenesulfonic acid. The resin therefore contained 6.25% of the added spirobi compound. After curing in the usual way for 2 hours at 70° C. and 8 hours at 100° C. the resin had these properties:

Heat distortion _____° C__ 102
Flexural modulus _____p.s.i__ 321,000
Hardness, durometer "D" _____ 85
Impact (Izod) (ft.-lbs. per in. of notch) _____ 0.7

EXAMPLE 4.—EFFECT OF ADDED 3,9-DIVINYL-SPIROBI(M-DIOXANE) ON RESIN PREPARED WITH HYDROCHLORIC ACID CATALYST

A charge of 845 grams of acrolein (96%), 1188 grams pentaerythritol, and 8.79 grams of 37% hydrochloric acid was charged to the apparatus described in Example 1. After reaction at 73–76° C. for 45 minutes the viscosity of the mixture was 160 cps. at 25° C. The volatile material was then distilled off to a kettle temperature of 75° C./7 mm. The stripped resin weighed 1612 grams.

A 90-gram portion of this A-stage resin was mixed with 0.27 gram of mixed alkanesulfonic acid. After curing in the usual way for 8 hours at 100° C. the material had these properties:

| | |
|---|---|
| Heat distortion ° C. | 76 |
| Flexural modulus p.s.i. | 461,000 |
| Hardness, durometer "D" | 84 |
| Impact (Izod) (ft.-lbs. per in. of notch) | 2.2 |

To another 90 grams portion of the stripped A-stage composition there was added 10 grams of 3,9-divinylspirobi(m-dioxane) and 0.3 gram mixed alkanesulfonic acid. After curing at 100° C. for 8 hours in the usual way the resin had these properties:

| | |
|---|---|
| Heat distortion ° C. | 91 |
| Flexural modulus p.s.i. | 321,000 |
| Hardness, durometer "D" | 84 |
| Impact (Izod) (ft.-lbs. per in. of notch) | 1.1 |

EXAMPLE 5.—EFFECT OF ADDED 3,9-DIVINYL-SPIROBI(M-DIOXANE) ON RESIN PREPARED WITH HYDROCHLORIC ACID CATALYST

A large batch of A-stage resin was prepared in the following manner: The reactor was a 25-gallon glass-lined vessel equipped with a condenser, agitator and steam vacuum jet. A charge of 56.5 pounds of acrolein (96.4%), 69.4 pounds of pentaerythritol and 186 grams of 37% hydrochloric acid was placed in the reactor and heated to 70° C. The mixture was held between 70 and 75° C. for 32 minutes. At the end of the reaction period the unreacted acrolein and water were stripped off to a kettle temperature of 73° C. at 3 mm.

To demonstrate the effect of added 3,9-divinylspirobi-(m-dioxane) on the properties of the cured resin, a series of runs was made in which incremental amounts of the unsaturated acetal was mixed with the A-stage polymer before it was cured. In all of these experiments 0.3% of mixed alkanesulfonic acids was added as curing agent and the resins were cured for eight hours at 100° C. The results are summarized in Table I.

Table I

| Percent 3,9-Divinylspirobi (m-dioxane) Added | Heat Distortion, ° C. | Flexural Modulus, p.s.i. | Hardness, Durometer "D" | Impact (Izod), ft.-lbs. per in. of Notch |
|---|---|---|---|---|
| None | 88 | 350,000 | 84 | 1.2 |
| 2.5 | 93 | 369,000 | 84 | 1.0 |
| 5.0 | 96 | 374,000 | 85 | 1.0 |
| 7.5 | 98 | 346,000 | 84 | 0.9 |
| 10.0 | 101 | 279,000 | 85 | 0.5 |
| 15.0 | 97 | 307,000 | 85 | 0.9 |
| 18.0 | 105 | 346,000 | 85 | 0.4 |
| 21.0 | 108 | 364,000 | 85 | 0.3 |
| 25.0 | 100 | 294,000 | 85 | 0.3 |
| 30.0 | 93 | 346,000 | 85 | 0.2 |

EXAMPLE 6.—3,9-DIVINYLSPIROBI(M-DIOXANE) ADDED TO LOW-VISCOSITY RESIN

To a two-liter reaction flask equipped with stirrer, thermometer, condenser and nitrogen feed line, there were charged 798 grams of 96.6% acrolein (13.75 moles), 1127 grams pentaerythritol (9.29 moles), and 6.24 grams of 37% hydrochloric acid. The mixture was heated to 72° C. and held at 72–74° C. for 25 minutes. At the end of that time the material had a viscosity of 63 cps. at 25° C.

The volatile material was then distilled off to a kettle temperature of 71° C./7.5 mm. The residual A-stage resin had the following properties:

| | |
|---|---|
| Viscosity at 40° C. cps | 11,520 |
| Equivalent weight by hydroxyl analysis | 167 |
| Observed molecular weight (uncorrected for low-molecular weight components) | 362 |
| Equivalent weight by unsaturation analysis | 234 |
| Unreacted pentaerythritol percent | 3 |

A portion only of the A-stage liquid was charged to a still with a short unpacked column and stripped to a kettle temperature of 225°/3 mm. The amount of 3,9-divinylspirobi(m-dioxane) distilled off amounted to 24% of the charge. The resin remaining from this distillation had a molecular weight of 947.

The effect of adding additional 3,9-divinylspirobi(m-dioxane) to the other portions of the A-stage resin was determined in a series of experiments. All of these were cured at 100° C. for 8 hours with 0.3% mixed alkanesulfonic acids catalyst. The cured polymers had the following properties:

| Sample | Percent Divinylspirobi (m-dioxane) Added | Heat Distortion, ° C. | Impact Strength (Izod), ft.-lbs./in. of notch | Hardness, Durometer "D" | Flexural Modulus |
|---|---|---|---|---|---|
| A | None | 93 | 0.8 | 85 | 369,000 |
| B | 4.6 | 99 | 0.7 | 85 | 325,000 |
| C | 10 | 105 | 0.8 | 85 | 325,000 |
| D | 14.6 | 105 | 0.3 | 85 | 294,000 |
| E | 20 | 100 | 0.3 | 85 | 369,000 |
| F | 24.6 | 88 | 0.6 | 85 | 246,000 |

EXAMPLE 7.—3,9-DIVINYLSPIROBI(M-DIOXANE) ADDED TO HIGH-VISCOSITY RESIN

To the same reactor used in the preceding example, there was charged 798 grams of 96.6% acrolein (13.75 moles), 1127 grams of pentaerythritol, and 6.24 grams of 37% hydrochloric acid. The mixture was heated to 74° C. and held at 74–76° C. for 55 minutes. At the end of that time the viscosity of the solution was 312 cps. at 25° C. The volatile material was then distilled off to a kettle temperature of 79° C./7 mm. The residual A-stage resin had the following properties:

| | |
|---|---|
| Viscosity at 40° C. cps | 192,000 |
| Equivalent weight by hydroxyl analysis | 192 |
| Observed molecular weight (uncorrected for low-molecular weight components) | 498 |
| Equivalent weight by unsaturation analysis | 314 |
| Unreacted 3,9-divinylspirobi(m-dioxane) (obtained by stripping to 225° C./3 mm.) percent | 6.5 |
| Unreacted pentaerythritol do | 1 |

A series of experiments was made in which additional amounts of 3,9-divinylspirobi(m-dioxane) was added to the A-stage resin. These were then cured for 8 hours at 100° C. with 0.3% mixed alkanesulfonic acids catalyst. It will be seen that the total amount of the divinylspirobi-(m-dioxane) present in sample B was equivalent to that present in the unreacted state in the unmodified low-viscosity A-stage in the preceding example. The cured polymers had these properties:

| Sample | Percent Divinyl-spirobi (m-dioxane) Added | Properties of Cured Resin | | | |
|---|---|---|---|---|---|
| | | Heat Distortion, °C. | Impact Strength (Izod), ft.-lbs./in. of notch | Hardness, Durometer "D" | Flexural Modulus |
| A | None | 83 | 1.19 | 85 | 333,000 |
| B | 17.65 | 101 | 0.5 | 85 | 346,000 |
| C | 4.6 | 91 | 1.0 | 85 | |
| D | 10 | 97 | 0.55 | 85 | 364,000 |
| E | 14.6 | 100 | 0.3 | 85 | 346,000 |
| F | 20 | 96 | 0.3 | 85 | 329,000 |
| G | 24.6 | 93 | 0.3 | 85 | 364,000 |

It will be noted that sample B had a heat distortion point of 101° C. as compared to 93° C. for sample A in the preceding example.

What is claimed is:

1. Process of making a curable composition which comprises reacting acrolein and pentaerythritol in the presence of an acid catalyst wherein from 1.3 to 1.9 moles of acrolein are reacted per mole of pentaerythritol to form a liquid condensate, stripping off volatiles which are distillable from said condensate at temperatures of 71° C. to 80° C. and 3 mm. to 7.5 mm. of pressure to form a liquid resin, and adding monomeric isolated 3,9-divinylspirobi(m-dioxane) to the liquid resin in an amount of 2% to 25% of the total composition to form a curable composition.

2. Process of making a curable composition which comprises heating acrolein and pentaerythritol in the presence of an acid catalyst wherein from 1.3 to 1.9 moles of acrolein are reacted per mole of pentaerythritol to form a liquid condensate, ceasing the heating step when the viscosity of the condensate when stripped of volatiles which are distillable from said condensate at temperatures of 71° C. to 80° C. and 3 mm. to 7.5 mm. of pressure is from 25,000 to 500,000 cps. at 40° C., distilling said condensate to strip said volatile materials and to form a liquid resin, and adding monomeric isolated 3,9-divinylspirobi(m-dioxane) to the liquid resin in an amount of 2% to 25% of the total composition to form a curable composition.

3. Process of making synthetic resins of controlled heat distortion points which comprises reacting acrolein and pentaerythritol in the presence of an acid catalyst wherein from 1.3 to 1.9 moles of acrolein are reacted per mole of pentaerythritol to form a liquid condensate, stripping off volatiles which are distillable from said condensate at temperatures of 71° C. to 80° C. and 3 mm. to 7.5 mm. of pressure to form a liquid resin, adding monomeric isolated 3,9-divinylspirobi(m-dioxane) to the liquid resin in an amount of 2% to 25% of the total composition to form a curable composition, and curing said composition to a synthetic resin by heating in the presence of an acid catalyst.

References Cited in the file of this patent

UNITED STATES PATENTS

| 2,401,776 | Rothrock | June 11, 1946 |
| 2,687,407 | Orth | Aug. 24, 1954 |

FOREIGN PATENTS

| 868,351 | Germany | Feb. 23, 1953 |
| 870,032 | Germany | Mar. 9, 1953 |

OTHER REFERENCES

Schulz et al.: Angewandte Chemie, vol. 62, No. 5, pp. 105, 113, 114, 117, 118. Copy in Scientific Library.